United States Patent [19]

Gottlob

[11] Patent Number: 4,461,447
[45] Date of Patent: Jul. 24, 1984

[54] ENGINE MOUNTING FRAME
[75] Inventor: Clifford E. Gottlob, Arkansas City, Kans.
[73] Assignee: Gottlob Engine Conversions, Inc., Arkansas City, Kans.
[21] Appl. No.: 315,298
[22] Filed: Oct. 23, 1981
[51] Int. Cl.³ .............................................. F16M 1/00
[52] U.S. Cl. ................................. 248/678; 248/671; 248/676
[58] Field of Search ............... 248/639, 678, 679, 638, 248/671, 676, 659; 52/732, 730, 734; 180/291, 312

[56] References Cited

U.S. PATENT DOCUMENTS

| 851,973 | 4/1907 | Aus | 52/732 |
|---|---|---|---|
| 1,269,890 | 6/1918 | Wolf . | |
| 1,398,024 | 11/1921 | Jacobs | 180/312 |
| 1,565,624 | 12/1925 | Chilton | 180/312 |
| 2,078,117 | 4/1937 | Auryansen . | |
| 2,134,243 | 10/1938 | Berger . | |
| 2,139,113 | 12/1938 | Cline et al. | 248/639 |
| 2,296,181 | 9/1942 | Perkins | 180/312 |
| 2,597,841 | 5/1952 | Ridgway . | |
| 2,889,685 | 6/1959 | Pickman | 248/662 X |
| 3,101,272 | 8/1963 | Stezer . | |
| 3,834,105 | 9/1964 | Powers | 52/732 X |
| 3,995,403 | 12/1976 | Nickell | 52/732 X |

FOREIGN PATENT DOCUMENTS 2019330 10/1979 United Kingdom ............... 180/291

Primary Examiner—J. Franklin Foss
Attorney, Agent, or Firm—Irvin A. Lavine

[57] ABSTRACT

An engine mounting frame includes longitudinal and transverse beams, the former being of paired channels. The longitudinal beams have upper and lower channels which open oppositely, the inner surface of the upper flange of the lower channel engaging the inner surface of the lower flange of the upper channel. The channels are joined by staggered intermittent fillet welds placed at the free edge of the said flanges. A beam so fabricated.

10 Claims, 4 Drawing Figures

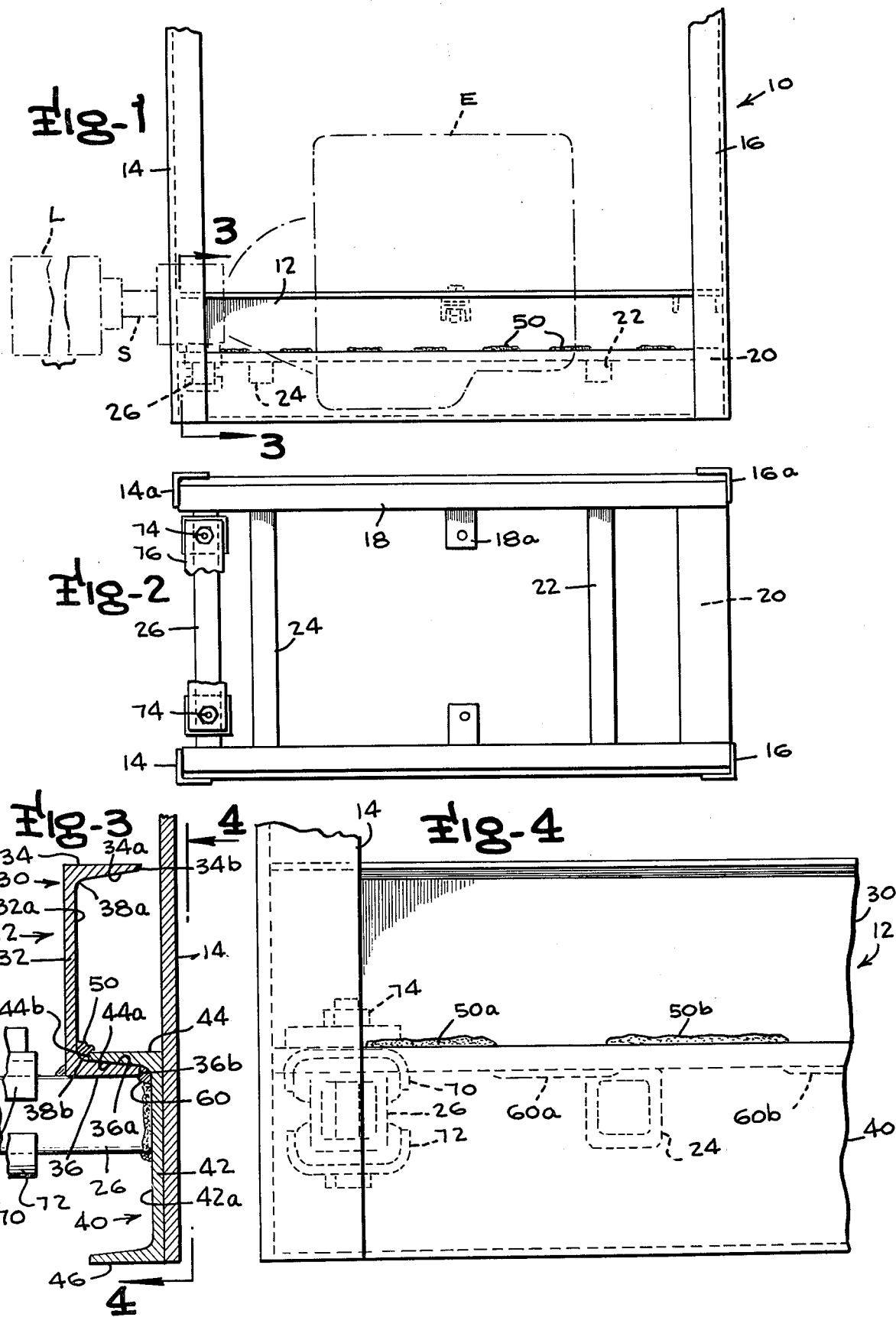

ENGINE MOUNTING FRAME

TECHNICAL FIELD

The present invention relates to an engine mounting frame, and to a load bearing beam which preferably forms a part of such frame.

BACKGROUND ART

Internal combustion engines and other relatively heavy objects require strong supporting frames, to withstand vibrations, shocks, etc. In particular, in connection with frames for stationary engines, that is, engines not used to power an automobile or truck, it is conventional to fabricate the frames of structural steel elements, providing beams of hollow tubes, single channels, I-beams, etc. The engine is bolted to such beams of the frame. In some stationary engine installations, an engine may be bolted directly to a cement floor, and where such a cement floor is not available, it is known to use cast iron frames or bases for the engines.

In certain operations, such as engines for driving oil well pumps, certain unique requirements must be met. For example, it is sometimes necessary to transport the engine and mounting frame, not only from the manufacturer to the site, but also, at times, to transport an engine and frame from one site to another. For such transportation, it is desirable to have a frame which is as light as possible, while still having suitable strength. Additionally, in the field of oil well pump drives, it is conventional to provide a drive system including a large counterweight, which, together with the load on the pump, imposes substantial loads on both the engine and the frame. Such loads are transmitted into the frame, are cyclical with the movement of the counterweight and pump, and are substantial in magnitude. Since the pumps are operated continuously for days and months, the number of cycles imposed without interruption is very large. These loads are therefore severe, and the frames heretofore provided to withstand them have frequently been of cast iron.

The heretofore used frames for well pump engines have not been entirely satisfactory, either because of a lack of suitable strength, or being too heavy, or both. In the case of a cast iron frame, the propensity of such frames to fail by cracking due to such vibrational loads, shock loads, and/or wide variations in temperature, is known.

Where beams have been provided, for general utility purposes, they have conventionally been made of an I-beam, a hollow tube, T-shape, or a single channel of designed strength. Such beams, and fabricated beams of structural shapes have been provided, but are not suitable for the all purposes; they do not dampen vibrations from certain loads to a satisfactory extent.

DISCLOSURE OF THE INVENTION

The present invention is directed to an engine mounting frame which is made up of one of more beam members fabricated from a pair of channels, welded together, so that they face in opposite directions, having their webs substantially parallel. A flange of one channel has the inner surface thereof engaging the inner surface of a flange of the other channel, and the channels are welded together. Welding is effected by staggered intermittent fillet welds located at the free edges of the abutting flanges, and joining a flange of one channel to the web of the other channel. The engine and/or related structure, such as a coupling, is mounted to the joined flanges, which are resistant to and effect dampening of the cyclical vibrations imposed from the load, such as the pump and counterweight.

The engine mounting frame, when constructed of such beams, has the beams extending at least in the longitudinal direction of the frame, and may also have such beams extending transversely.

A beam as above described may be provided, used for other purposes.

The herein disclosed engine mounting frame and beam are of great strength, with relatively low weight. Such an engine frame will withstand heavy loads, including both vibrational and shock loads, and, further, such an engine mounting frame dampens vibrations from the load.

BRIEF DESCRIPTION OF DRAWINGS

FIG. 1 is an elevational view of an engine mounting frame embodying the present invention, showing an engine and load.

FIG. 2 is a plan view of the frame, without the engine and load.

FIG. 3 is a cross sectional view taken on the line 3—3 of FIG. 1.

FIG. 4 is a view taken on the line 4—4 of FIG. 3.

BEST MODE FOR CARRYING OUT THE INVENTION

Referring now to the drawings, wherein like or corresponding reference numerals are used to designate like or corresponding parts throughout the several views, there is shown in FIG. 1 an engine mounting frame 10 comprising a transverse beam 12, and a pair of end columns 14 and 16. An engine E is shown mounted on frame 10, and a shaft S driven by the engine E drives a load L, which may be the counterweight and pump of a well. Such a load produces cyclical vibrations, which are transmitted into the frame 10 and engine E. The showing of the engine E and load L are diagrammatic, the load being conventional.

In FIG. 2, there may be seen mounting frame 10, without the engine E and load L; the longitudinal beam 12 has a second longitudinal beam 18, in spaced, parallel relationship thereto. In addition, the end columns 14 and 16 may be seen, shaped as angle irons, together with corresponding columns 14a and 16a. Engine mounting brackets 12a and 18a are connected to beams 12 and 18, respectively, as by welding, and the engine 10 is supported, in part at least, on the brackets 12a and 18a, being secured by suitable bolts, the mounting preferably including an elastomeric material. Transverse beams are provided, and are here illustrated as transverse beams 20, 22, 24 and 26. The positioning and size of each of the transverse beams is illustrative only, and may be varied as required in connection with a particular engine mounting frame 10. As herein disclosed, such transverse beams may be hollow tubes.

In FIG. 3 there is shown a cross sectional view of the beam 12, which will be seen to include an upper channel 30 comprising a transverse web 32, an upper flange 34, and a lower flange 36 in spaced, parallel relation to flange 34. Flange 34 has an inclined inner surface 34a, with a free edge 34b. Similarly, lower flange 36 has an inclined inner surface 36a and a free edge 36b. The web 32 has an inner surface 32a. The inner surfaces of the two flanges 34 and 36 and of the web 32 do not intersect, but are connected by upper radius 38a and lower radius 38b which connect, respectively, inner surface 34a and inner surface 32a, and inner surface 36a and inner surface 32a.

The lower channel 40 is of substantially the same shape, and is preferably the same size as the channel 30, and as will be seen has a web 42 which is substantially parallel to the web 32, together with an upper flange 44 and a lower flange 46. The channels 30 and 40 are faced in opposite directions. The inner surface 44a of flange 44 engages the inner surface 36a of flange 36. The edge 44b of flange 44 is placed substantially at the juncture of the radius 38b and the inner surface 36a, and since the channels 30 and 40 are substantially the same size and shape, the free edge 36b of flange 36 will be located at the juncture of radius 48a connecting inner surface 44a and inner surface 42a.

The channels 30 and 40 are joined by welding indicated at 50 and 60 on FIG. 3. The weld 50 is located at the free edge 44b of flange 44, and joins it to the inner surface 32a, the radius 38b and a small portion of the inner surface 36a. The weld 60 similarly joins the free edge 36b of flange 36 to channel 40 at radius 48a, a portion of inner surface 44a and a portion of inner surface 42a.

The weld 50, as shown in FIG. 4, is a series of intermittent fillet welds 50a, 50b and the welds 60 are a series of intermittent fillet welds 60a and 60b. The welds 50a, 50b, etc., are in staggered relationship to the welds 60a and 60b, with a small amount of overlap. Thus, the channels 30 and 40 are joined by staggered intermittent fillet welds. This welding configuration avoids significant warpage of frame 10.

While the term "fillet weld" has been used herein, it will be understood that the welds 50, 60 actually include portions which are deposited into a small channel formed between the free edge of one flange and the inner surface of the web of the other channel, while a portion of the weld metal extends beyond this small channel.

Referring again to FIGS. 2, 3 and 4, there is illustrated a structure for connecting the engine E to the identical beams 12 and 18, and more particularly to the double thickness of metal provided by the joined flanges 36 and 44. The transverse hollow beam 22 is welded to the beams 12 and 18, FIG. 3 showing it welded at one end to the underside of channel 30 and to the inner surface 42a of web 42 of channel 40. U-shaped clamping members 70 and 72 engage the beam 22, held by a bolt 74. A plate 76, shown broken away in FIG. 2, is secured or joined to the engine, or support for the shaft S. Consequently, vibrational loads are transmitted into the beam 22 and thence into the joined flanges 36 and 44, which dampen them.

The beam 12, particularly as illustrated in FIGS. 3 and 4, may be utilized other than in an engine mounting frame. Thus, the beam 12 may be used where a relatively strong beam may be desired, particularly adapted for damping vibrations.

An engine mounting frame in accordance with the present invention is of great strength, of comparatively light weight. It is capable of damping vibrational loads and withstanding large shock loads. An engine mounting frame in accordance with the present invention may be readily fabricated by welding from available components.

It will be obvious to those skilled in the art that various changes may be made without departing from the spirit of the invention and therefore the invention is not limited to what is shown in the drawings and described in the specification but only as indicated in the appended claims.

I claim:
1. An engine mounting frame comprising:
    a pair of parallel longitudinal beams, at least one longitudinal beam comprising first and second channels each including a pair of spaced, substantially parallel flanges and a web transverse thereto, said channels opening in opposite directions and having their webs substantially parallel, the inner surface of the flange of one channel engaging the inner surface of the flange of the other channel, and weld means joining said channels together, said weld means being at the free edges of each of said engaging flanges,
    transverse beams connected to the longitudinal beams, and at least one transverse beam welded to a said engaged flange of said longitudinal beam, and
    means for connecting a load to said one transverse beam,
    whereby vibrations from an engine on said frame are dampened by said longitudinal beam.
2. The structure of claim 1, each of said engaging flanges having the free edge thereof closely adjacent the web of the other channel.
3. The structure of claim 2, each said channel having said inner surfaces of said flanges inclined relative to the outer surface thereof, and joined by a radius to the web inner surface, the free edge of at least one said flange located at the boundary between said inner surface of the flange of said other channel and the radius adjacent thereto.
4. The structure of claim 3, wherein said welding comprises staggered intermittent fillet welds.
5. The engine mounting frame of claim 1, wherein said welding comprises staggered intermittent fillet welds.
6. An engine mounting frame comprising:
    a pair of parallel longitudinal beams, at least one longitudinal beam comprising first and second channels each including a pair of spaced, substantially parallel flanges and a web transverse thereto, said channels opening in opposite directions and having their webs substantially parallel, the inner surface of the flange of one channel engaging the inner surface of the flange of the other channel, and weld means joining said channels together, said weld means being at the free edges of each of said engaging flanges,
    at least one transverse beam connected to said longitudinal beams, and
    means for connecting a load to said one transverse beam.
    whereby vibrations from an engine on said frame are dampened by said longitudinal beam.
7. The structure of claim 6, each of said engaging flanges having the free edge thereof closely adjacent the web of the other channel.
8. The structure of claim 7, each said channel having said inner surfaces of said flanges inclined relative to the outer surface thereof, and joined by a radius to the web inner surface, the free edge of at least one said flange located at the boundary between said inner surface of the flange of said other channel and the radius adjacent thereto.
9. The structure of claim 8, wherein said welding comprises staggered intermittent fillet welds.
10. The engine mounting frame of claim 6, wherein said welding comprises staggered intermittent fillet welds.

* * * * *